United States Patent
Honaga et al.

Patent Number: 5,934,074
Date of Patent: Aug. 10, 1999

[54] HYDRAULIC POWER STEERING APPARATUS

[75] Inventors: Susumu Honaga, Aichi-ken; Osamu Watanabe, Okazaki; Yuji Yoshizawa, Nissin; Isao Hasegawa, Seto, all of Japan

[73] Assignee: Toyoda Koki Kabushiki Kaisha, Kariya-shi, Japan

[21] Appl. No.: 08/966,249

[22] Filed: Nov. 7, 1997

[30] Foreign Application Priority Data

Nov. 7, 1996 [JP] Japan .................................. 8-295468
Jan. 31, 1997 [JP] Japan .................................. 9-019317

[51] Int. Cl.$^6$ ........................... F15B 13/042; B62D 5/06
[52] U.S. Cl. ................................. 60/469; 60/494
[58] Field of Search ....................... 60/494, 469

[56] References Cited

U.S. PATENT DOCUMENTS

| | | | |
|---|---|---|---|
| 3,099,135 | 7/1963 | Hoadley | 60/469 |
| 3,878,763 | 4/1975 | Lang | 60/494 |
| 4,673,051 | 6/1987 | Darling et al. | 180/442 |
| 5,778,756 | 7/1998 | Haga et al. | 60/494 |

FOREIGN PATENT DOCUMENTS

| | | |
|---|---|---|
| 1-33419 | 10/1989 | Japan . |
| 1-3419 | 10/1989 | Japan . |
| 2-533 | 1/1990 | Japan . |
| 2-49109 | 12/1990 | Japan . |
| 2 051 714 | 1/1981 | United Kingdom . |

*Primary Examiner*—Sheldon J. Richter
*Attorney, Agent, or Firm*—Oblon, Spivak, McClelland, Maier & Neustadt, P.C.

[57] ABSTRACT

A hydraulic power steering apparatus includes a pump for discharging pressurized operation fluid, a power cylinder for generating assisting force, a control valve connected to the pump via a fluid path for receiving the operation fluid from the pump and adapted to supply the operation fluid to the power cylinder in accordance with operation of a steering wheel, a rubber hose disposed in the fluid path. A check valve is disposed between the rubber hose and the control valve. Since reverse flow of the operation fluid due to input of kick-back force is prevented, tires to be steered are prevented from undesirably steered against the driver's intention. Further, a pressure relieving mechanism is provided to relieve part of the operation fluid when the check valve operates. Therefore, the oil pressure within the power cylinder and the control valve is prevented from increasing excessively, so that the oil pressure within the pump does not reach a preset relief pressure.

8 Claims, 15 Drawing Sheets

HYDRAULIC POWER STEERING APPARATUS

BACKGROUND OF THE INVENTION

1. Field of the Invention

The present invention relates to a hydraulic power steering apparatus, and more particularly to a hydraulic power steering apparatus in which a check valve is disposed between a rubber hose provided in a fluid path for feeding operation fluid from a pump and a control valve for supplying the operation fluid to a power cylinder.

2. Description of the Related Art

In a conventional power steering apparatus, in order to reduce pulsation or variations in the pressure of operation fluid discharged from a pump, a rubber hose is disposed in a fluid path for supplying the operation fluid from the pump to a control valve. However, when a vehicle travels on an uneven road surface and a resistance force (so-called kick-back force) is input to a tire to be steered, the rubber hose expands and allows the operation fluid to flow reversely. The kick-back force causes the power cylinder to be operated, with the result that the tires to be steered are undesirably steered against the driver's intention.

Each of Japanese Utility Model Application Laid-Open (kokai) Nos. 1-33419 and 2-533 discloses a technique that solves the above-described problems. In the conventional technique, a check valve is disposed within a pressure port of a control valve in order to prevent reverse flow of the operation fluid.

In the conventional power steering apparatus, however, when a large kick-back force is input from a tire that runs onto a curbstone or the like, the oil pressure within the power cylinder and the control valve increases excessively, resulting in a possibility that the oil pressure within a pump located on the upstream side of the check valve reaches a preset relief pressure. Also, seal parts must have an enhanced seal performance in order to sustain such an increase in the oil pressure.

SUMMARY OF THE INVENTION

An object of the present invention is to provide an improved hydraulic power steering apparatus in which oil pressure within a power cylinder and a control valve is prevented from increasing excessively even when a large kick-back force is received from a tire or tires to be steered.

In order to achieve the above object, the present invention provides a hydraulic power steering apparatus which includes a pump for discharging pressurized operation fluid; a power cylinder for generating assisting force; a control valve connected to the pump via a fluid path for receiving the operation fluid from the pump and adapted to supply the operation fluid to the power cylinder in accordance with operation of a steering wheel; a rubber hose disposed in the fluid path; a check valve disposed between the rubber hose and the control valve; and pressure relief means for partially relieving the operation fluid when the check valve operates.

In a-hydraulic power steering apparatus according to the prevent invention, the tires to be steered are prevented from being undesirably steered against the driver's intention due to kick-back.

When a large kick-back force is received from a tire that runs onto a curbstone or the like and the check valve operates, the operation fluid is partially relieved. Thus, the oil pressure within the power cylinder and the control valve is prevented from increasing excessively, so that the oil pressure within the pump stays below a preset relief pressure. Accordingly, considerable enhancement of the seal performance of seal parts used in the control valve, the power cylinder, etc., is not required.

BRIEF DESCRIPTION OF THE ACCOMPANYING DRAWINGS

Various other objects, features and many of the attendant advantages of the present invention will be readily appreciated as the same becomes better understood by reference to the following detailed description of the preferred embodiments when considered in connection with the accompanying drawings, in which.

DETAILED DESCRIPTION OF PREFERRED EMBODIMENTS

Embodiments of the present invention will now be described with reference to the attached drawings.

A first embodiment will be described with reference to FIGS. 1 to 6.

Figure 1:
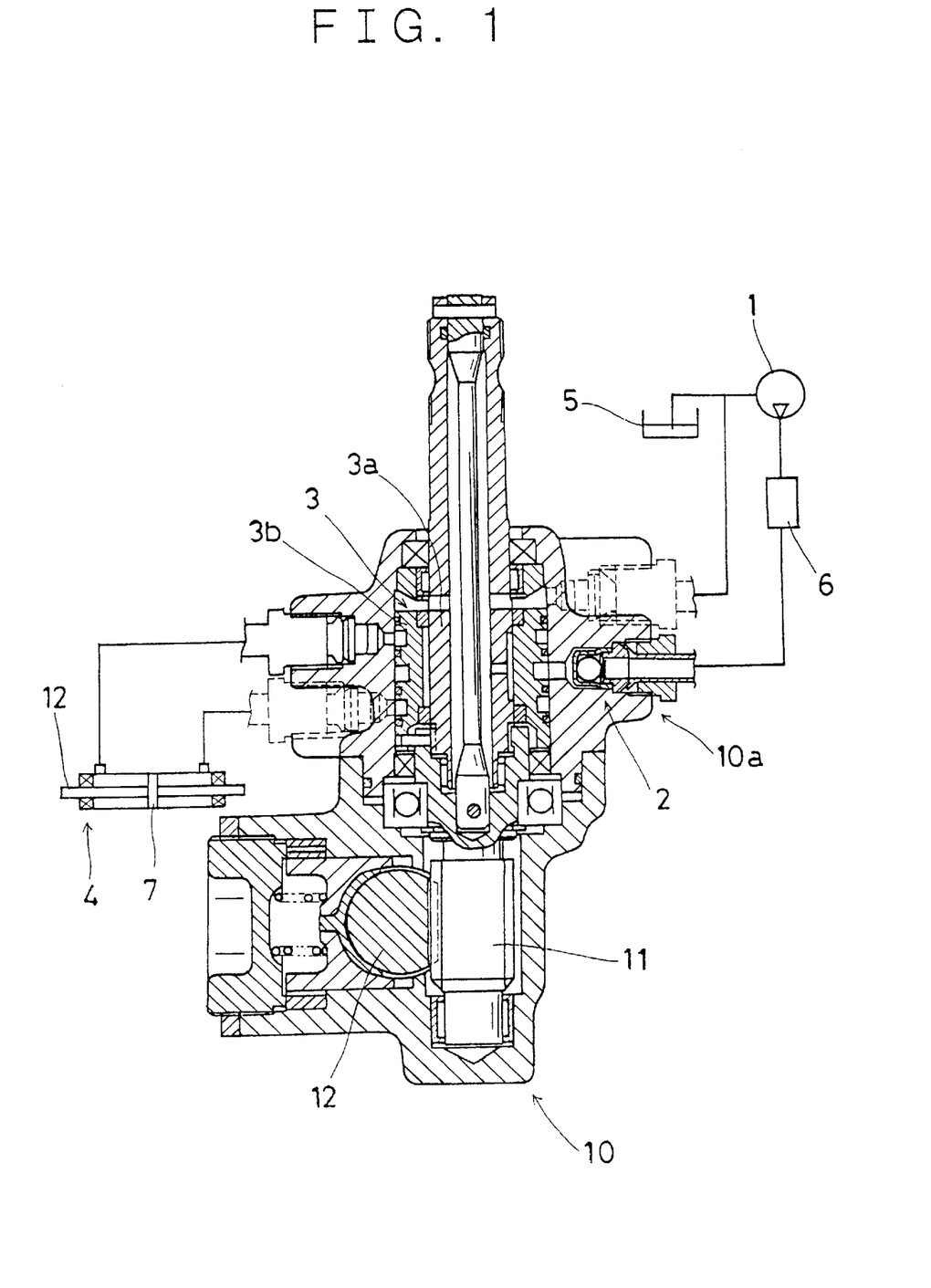
FIG. 1 is a diagram showing the overall structure of a hydraulic power steering apparatus according to a first embodiment of the present invention.
Figure 2:
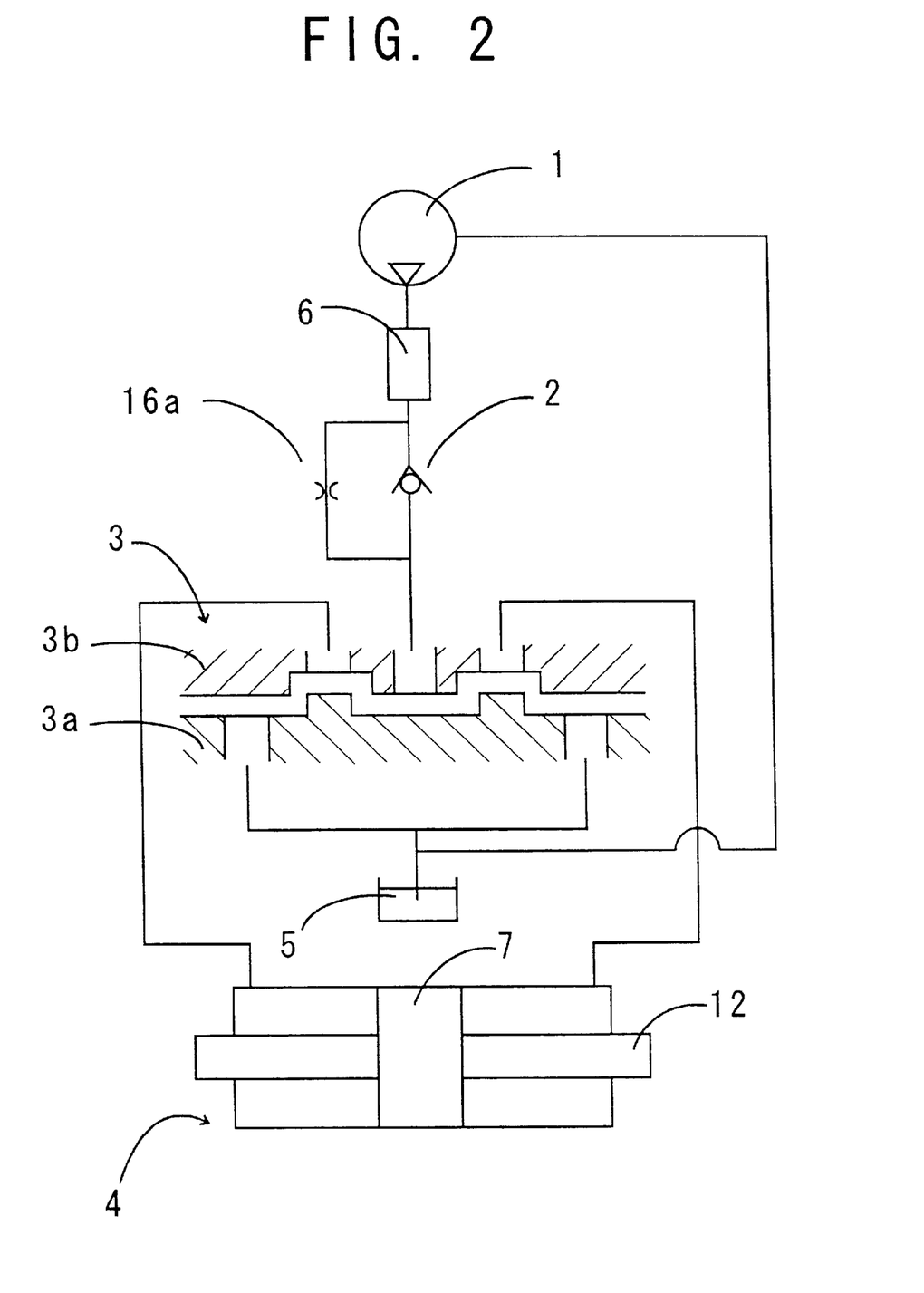
FIG. 2 is a hydraulic circuit diagram of the power steering apparatus of FIG. 1.

First, the overall structure of a power steering apparatus will be described with reference to FIGS. 1 and 2.

Operation oil discharged from a pump 1 flows into a pressure port 10a formed in a gear housing 10 via a fluid path, in which a rubber hose 6 is disposed. The operation fluid supplied to the pressure port 10a is introduced into respective pressure chambers of a power cylinder 4 via a control valve 3, which is operated by an unillustrated steering wheel.

The control valve 3 is composed of an inner member 3a and an outer member 3b. The inner member 3a is connected to the unillustrated steering wheel, while the outer member 3b is connected to a rack shaft 12 via a pinion 11. The rack shaft 12 is disposed to penetrate the power cylinder 4. The inner chamber of the power cylinder 4 is divided into right and left pressure chambers by a piston 7 disposed on the rack shaft 12.

When the steering wheel is operated, a relative rotation is produced between the inner member 3a and the outer member 3b of the control valve 3. Thus, the operation fluid discharged from the pump 1 is introduced into one of the pressure chambers, while the other pressure chamber is connected to a reservoir 5. As a result, the rack 12, which is connected to unillustrated steerable tires, is moved. Thus, the driver's steering operation is assisted.

In the steering apparatus according to the present embodiment, a check vale 2 is disposed in the pressure port 10a, and pressure relief means 16a is disposed parallel to the check valve 2.

Figure 3:
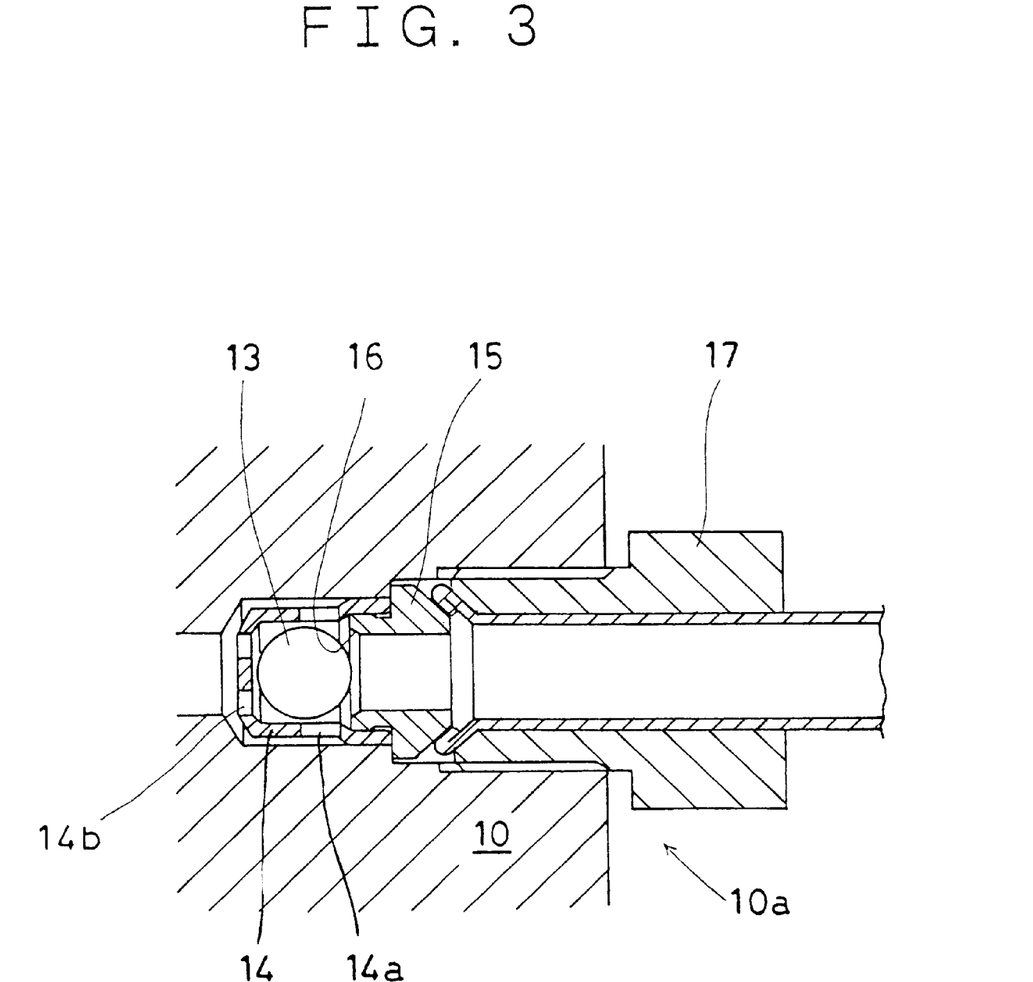
FIG. 3 is a sectional view of a check valve used in the power steering apparatus of FIG. 1, showing an ordinary state.
Figure 4:
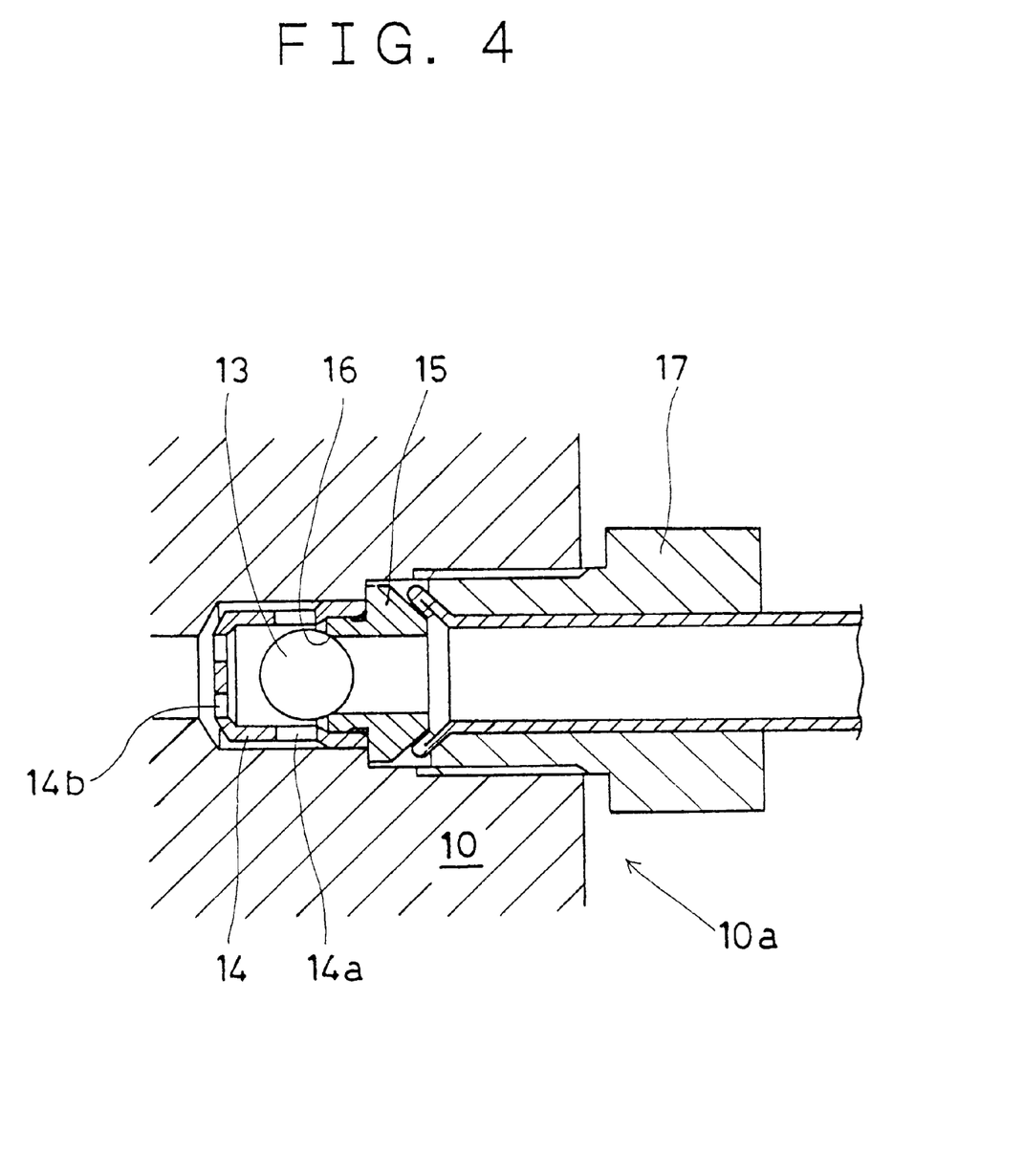
FIG. 4 is a sectional view corresponding to FIG. 3 and showing a state in which a kick-back force is input to the power steering apparatus.
Figure 5:
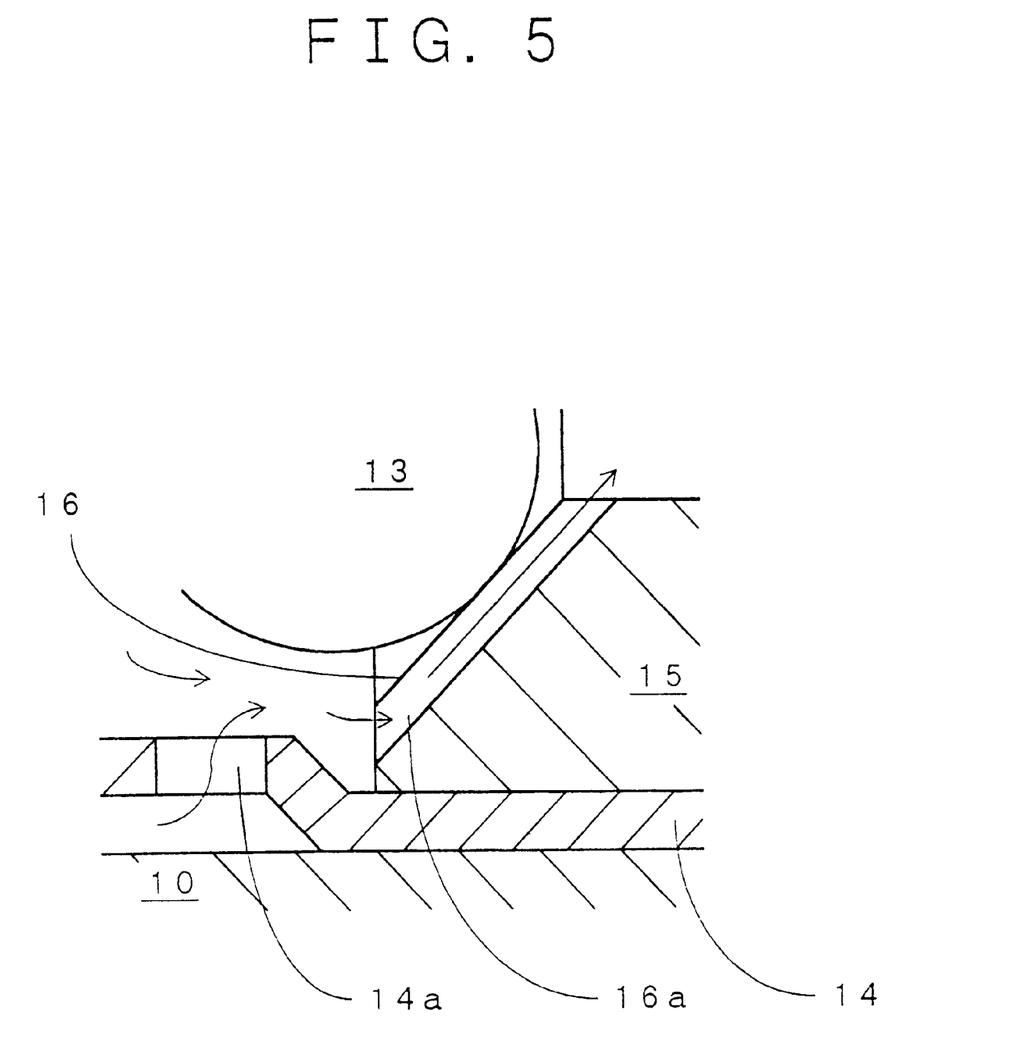
FIG. 5 is an enlarged view of a main portion of the FIG. 4.

FIGS. 3 and 5 are enlarged views of the check valve 2 and the pressure relief means 16a. FIG. 3 shows an ordinary state, while FIG. 4 and 5 show a state in which a kick-back force is input to the power steering apparatus.

As shown in FIGS. 3 and 4, the check valve 2 includes a ball 13, a cup-shaped tubular member 14 in which the ball 13 is accommodated, a seat union 15 press-fitted into the open end of the tubular member 14. The tubular member 14 has an inner diameter slightly greater than the diameter of the ball 13. Holes 14a and 14b are respectively formed in the circumferential wall and the bottom wall of the tubular member 14. The inner diameter of the seat union 15 is smaller than the diameter of the ball 13. The inner end of the seat union 15 has a tapered ball-seat surface 16 on which the ball 13 sits. Moreover, as shown in FIG. 5, a groove 16a serving as the pressure relief means is formed in the ball-seat surface 16 of the seat union 15.

The check valve 2 having the above-described structure is fixedly disposed in the pressure port 10a through fastening of a filling nut 17. In the fixed state, as shown in FIGS. 3 and 4, an annular space is formed between the tubular member 14 and the circumferential wall of a hole in the pressure port 10a.

In an ordinary traveling state, as shown in FIG. 3, the operation fluid discharged from the pump 1 flows through a clearance between the ball 13 and the tubular member 14 and passes through the holes 14b in order to flow into the control valve 3. The operation fluid also flows through the holes 14a and passes through the annular space between the tubular member 14 and the circumferential wall of the hole that constitutes the pressure port 10a in order to flow into the control valve 3.

Next, with reference to FIGS. 4–6, a description will be given of an operation in a case where a kick-back force is input to the power steering apparatus.

Figure 6:
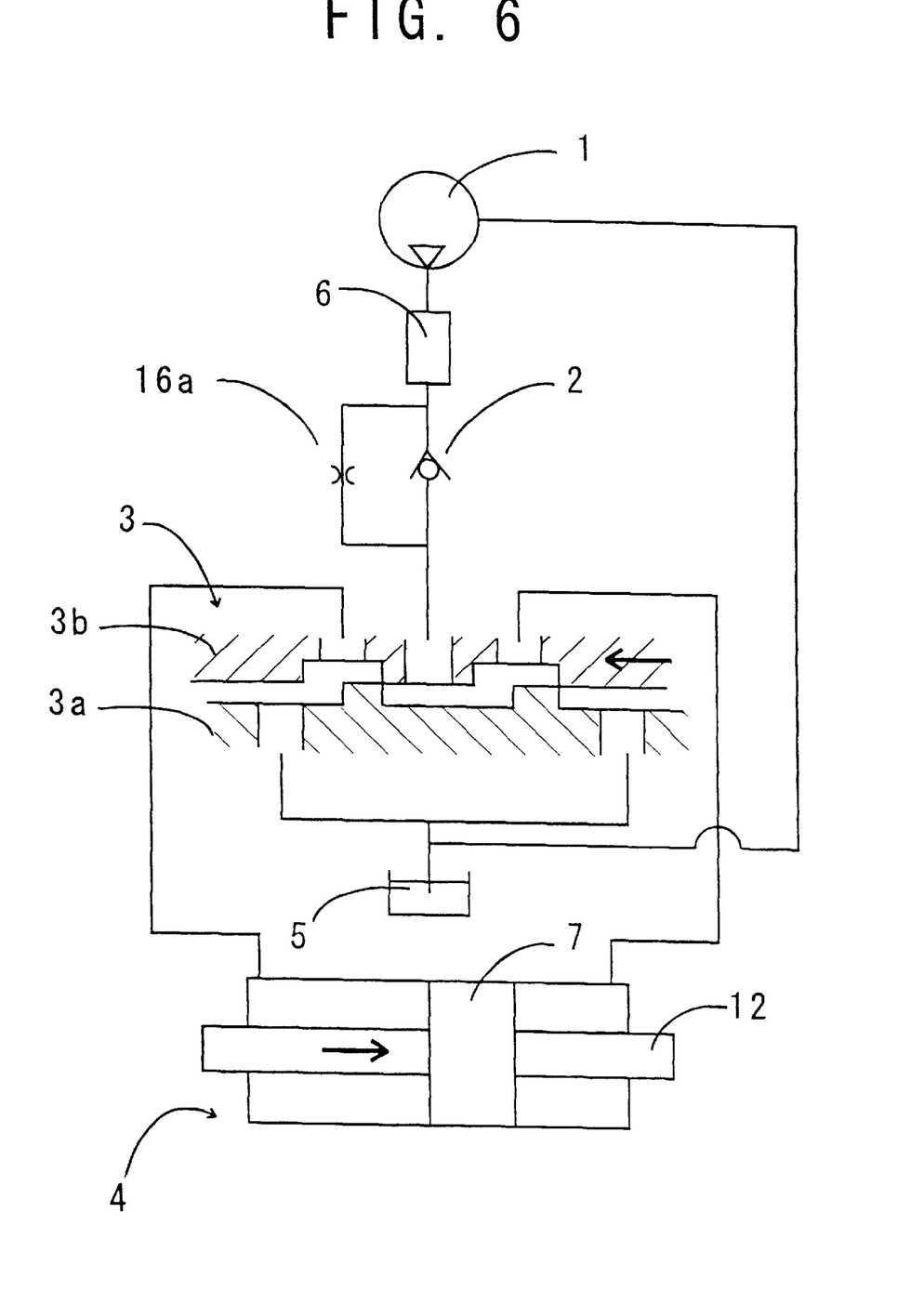
FIG. 6 is a hydraulic circuit diagram corresponding to FIG. 2 and showing a state in which a kick-back force is input to the power steering apparatus.

As shown in FIG. 6, when a kick-back force is input to the power steering apparatus, the rack shaft 12 connected to the tires to be steered is forcibly moved in one direction, so that the piston 7 disposed on the rack shaft 12 moves within the power cylinder 4. In addition, the movement of the rack shaft 12 causes rotation of the outer member 3b of the control valve 3, which is connected to the rack shaft 12 via the pinion 11. Thus, communication between the power cylinder 4 and the pressure port 10a is established. At this time, the operation fluid within the power cylinder 4 is compressed due to movement of the piston 7, the ball 13 of the check valve 12 sits on the ball-seat surface 16 of the seat union 14, thereby preventing reverse flow of the operation fluid. Therefore, the driver's does not feel an undesirable steering.

When the check valve 2 operates, part of the operation fluid flows reversely through the groove 16a formed in the ball-seat surface 16. This partial reverse flow is permitted through expansion of the rubber hose 6. However, the amount of the partial reverse flow is so small that the driver does not feel the undesirable steering and this partial reverse flow is permitted through expansion of the rubber hose 6.

When a tire runs onto a curbstone and a large kick-back force is input to the power steering apparatus, part of the operation fluid is relieved. Therefore, the pressure of the operation fluid within the power cylinder 4 and the control valve 3 is prevented from increasing excessively, so that the pressure of the operation fluid within the pump 1 is prevented from increasing to the preset relief pressure.

Figure 7:
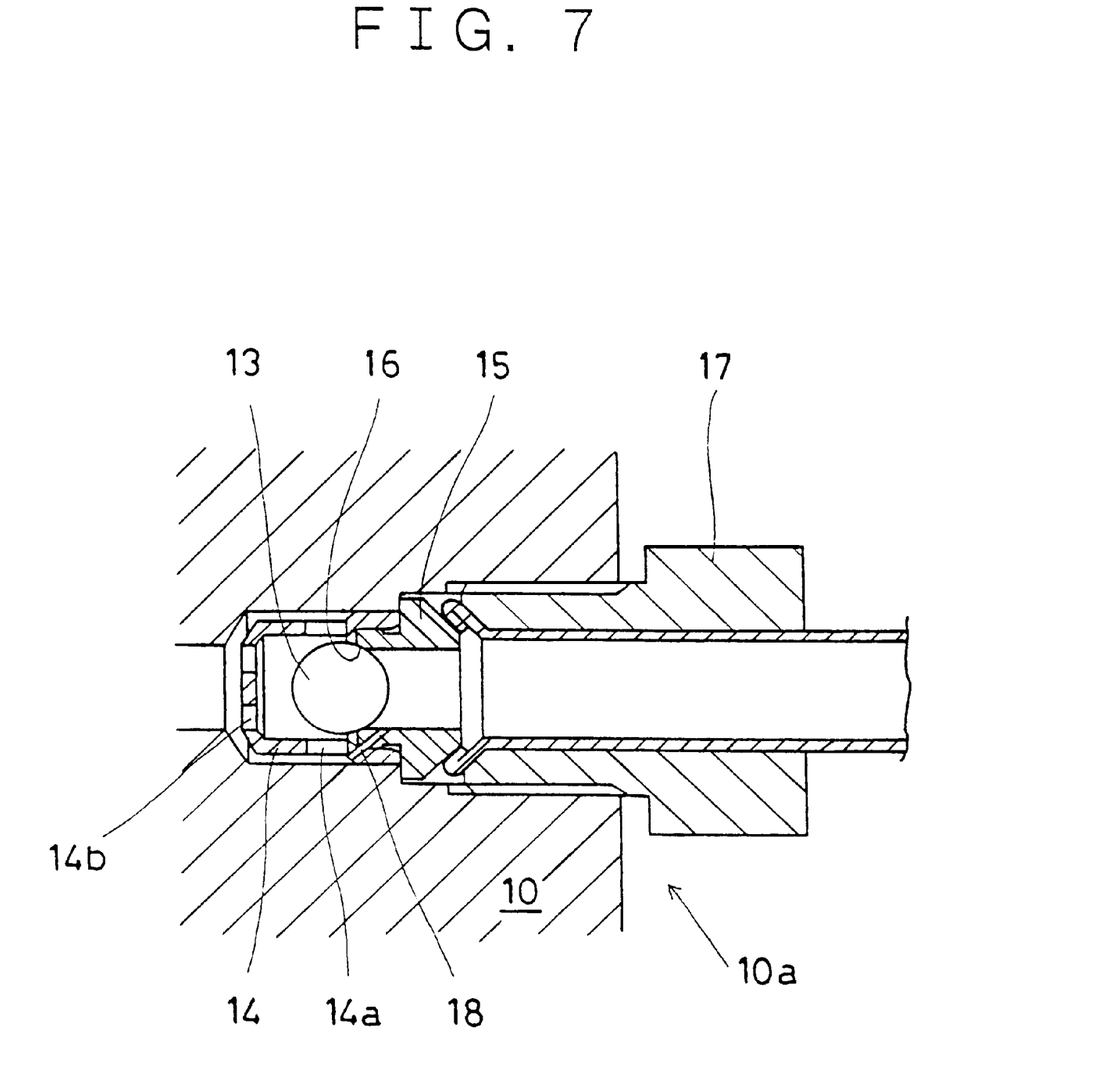
FIG. 7 is a sectional view of a check valve according to a second embodiment of the present invention.

Next, a second embodiment of the present invention will be described with reference to FIG. 7. In the second embodiment, a through hole 18 serving as the pressure relief means is formed such that the through hole 18 penetrates the seat union 15 and the tubular member 14.

Figure 8:
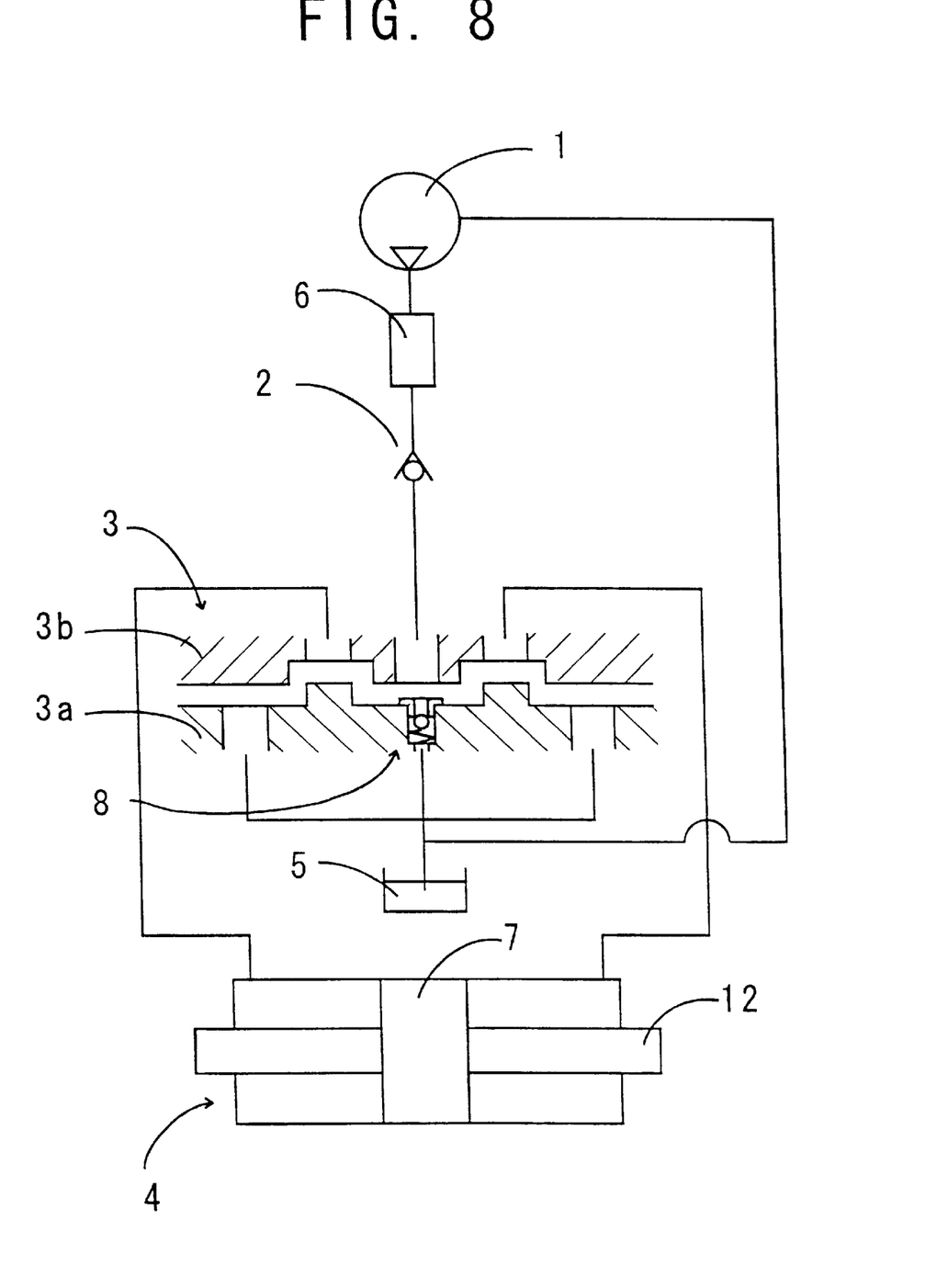
FIG. 8 is a hydraulic circuit diagram showing a third embodiment of the present invention.

Next, a third embodiment of the present invention will be described with reference to FIG. 8. In the third embodiment, a relief valve 8 serving as the pressure relief means is provided in the inner member 3a of the control valve 3 such that the relief valve 8 faces the pressure port 10a.

In the present embodiment, when a kick-back force is input to the power steering apparatus, reverse flow of the operation fluid is prevented by the check valve 2. However, when the kick-back force is greater than a predetermined level, the relief valve 8 opens in order to relieve part of the operation fluid and drain it to the reservoir 5.

Figure 9:
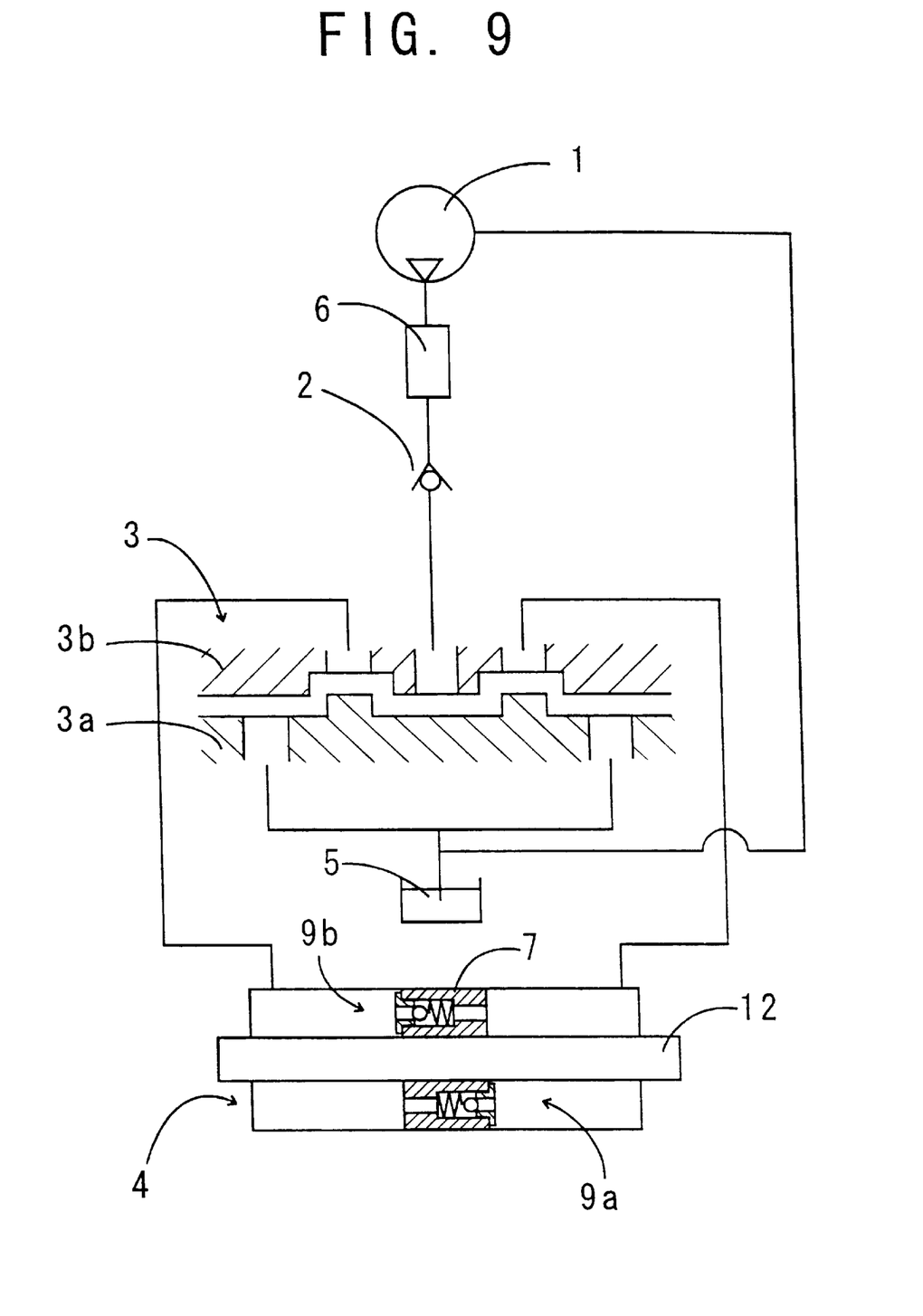
FIG. 9 is a hydraulic circuit diagram showing a fourth embodiment of the present invention.

Next, a fourth embodiment of the present invention will be described with reference to FIG. 9. In the fourth embodiment, relief valves 9a and 9b serving as the pressure relief means are provided within the piston 7.

In the present embodiment, when a kick-back force is input to the power steering apparatus, reverse flow of the operation fluid is prevented by the check valve 2. However, when the kick-back force is greater than a predetermined level, one of the relief valves 9a and 9b that faces the high-pressure-side chamber of the power cylinder 4 opens in order to allow part of the operation fluid to flow into the low-pressure-side chamber of the power cylinder 4 and return to the reservoir 5.

Figure 10:
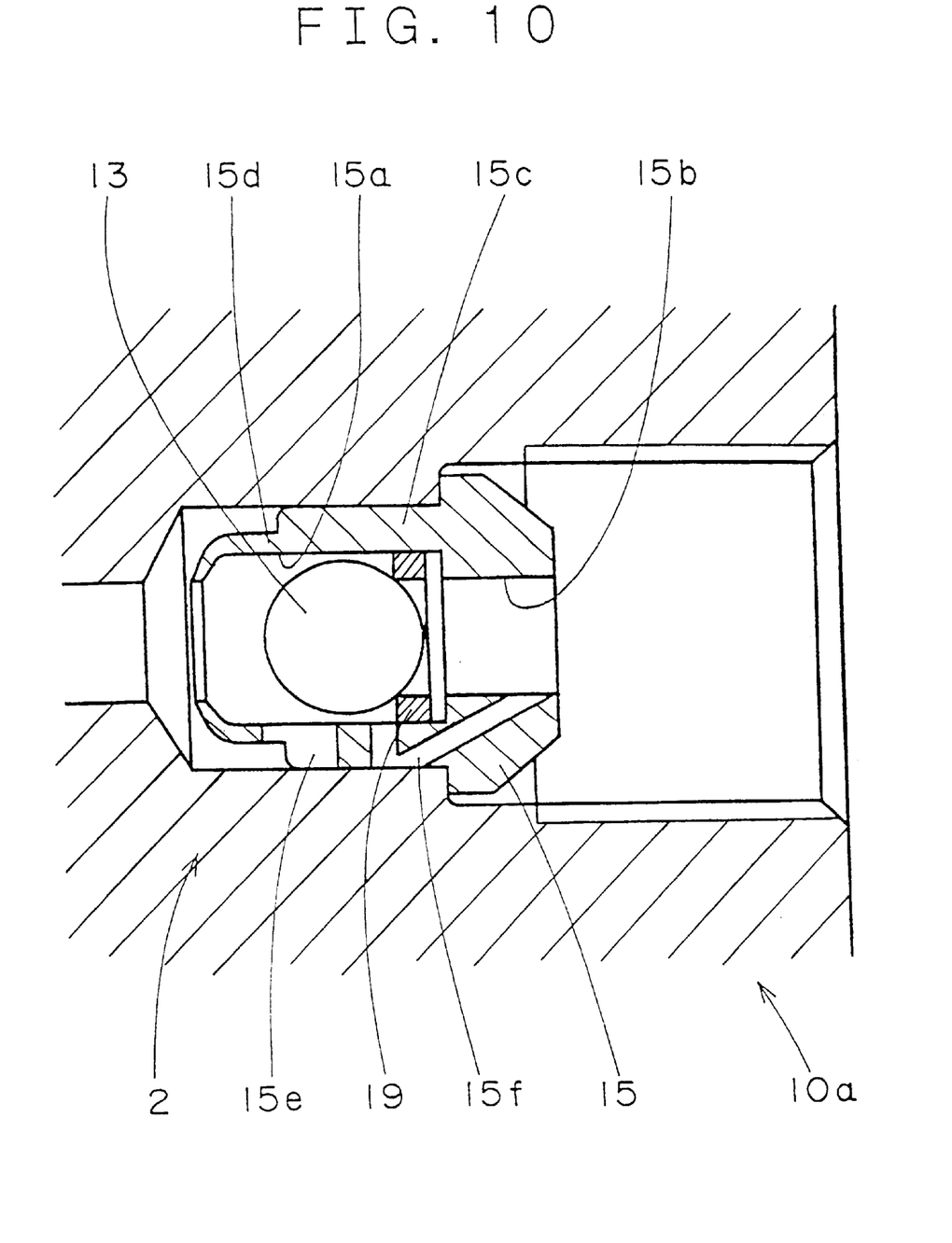
FIG. 10 is a sectional view of a check valve according to a fifth embodiment of the prevent invention.

Next, a fifth embodiment of the present invention will be described with reference to FIGS. 10–12. In the fifth embodiment, the check valve 2 includes a ball 13 and a seat union 15 having a larger diameter hole 15a and a smaller diameter hole 15b. After the ball 13 is placed into the larger diameter hole 15a of the seat union 15, the open end portion of the seat union 15 is caulked in order to complete the check valve 2. Therefore, the seat union 15 is a one piece to make it compact and to be able be assembled easily.

The seat union 15 has a thick wall portion 15c and a thin wall portion 15d at an axial position corresponding to the larger diameter hole 15a. The thick wall portion 15c is located adjacent to the smaller diameter hole 15b, while the thin wall portion 15d extends from the inner open end of the seat union 15, so that a stepped portion is formed on the outer periphery of the seat union 15. A single or a plurality of radial holes 15e are formed in the seat union 15 at an axial position corresponding to the stepped portion. Further, a plurality of communication holes 15f are formed in the seat union 15 such that the communication holes 15f extend from the wall surface of the larger diameter hole 15a to the wall surface of the smaller diameter hole 15b, and a ring 19 is press-fitted into the larger diameter hole 15a such that the ring 19 closes the communication holes 15f. When the pressure acting on the ball 13 exceeds a predetermined level, the ring 19 is pushed by the ball 13 and moves within the seat union 15. In FIGS. 10–12, the filling nut 17 is omitted.

Figure 11:
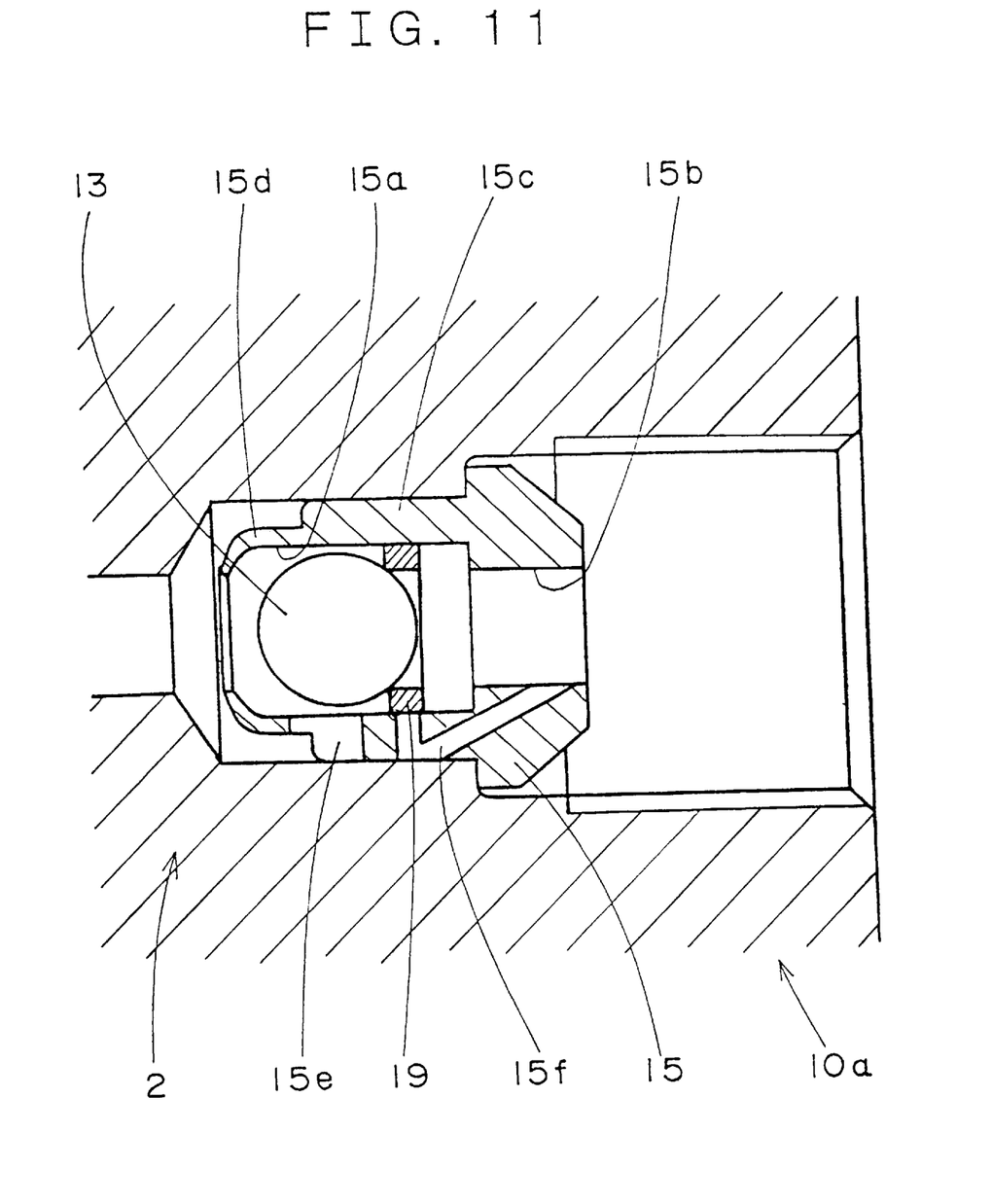
FIG. 11 is a sectional view corresponding to FIG. 10 and showing a state in which a small kick-back force is input to the power steering apparatus.

In the present embodiment, when a relatively small kick-back force is input to the power steering apparatus, the check valve 2 comes into a state shown in FIG. 11, so that the operation fluid is prevented from flowing reversely. Therefore, the steerable tires are not steered against the driver's intention.

Figure 12:
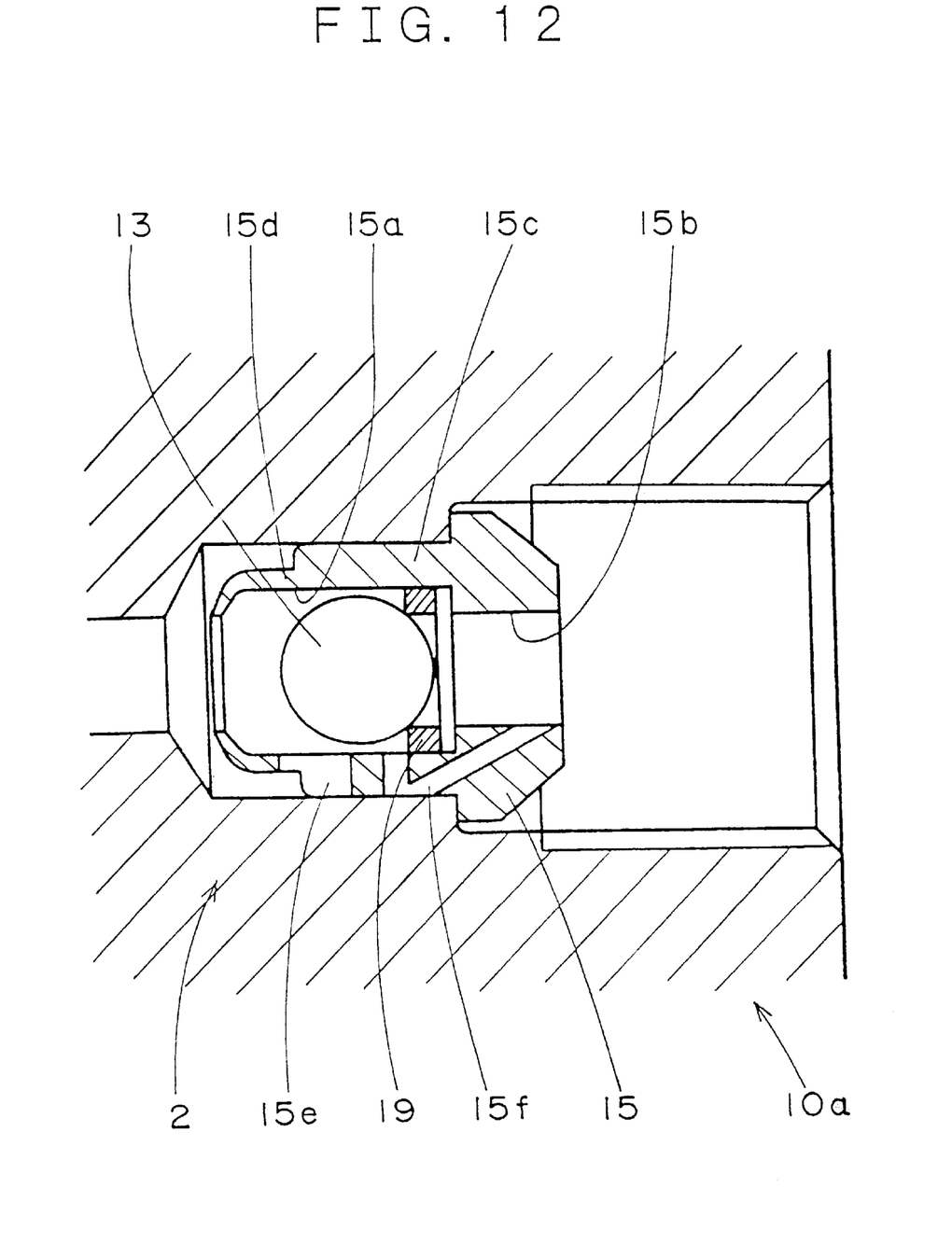
FIG. 12 is a sectional view corresponding to FIG. 10 and showing a state in which a large kick-back force is input to the power steering apparatus.

When a large kick-back force is input to the power steering apparatus, the check valve 2 comes into a state shown in FIG. 12. That is, the ring 19 moves rightward in FIG. 12, so that the communication holes 15f are opened to allow reverse flow of the operation fluid. Therefore, the pressure of the operation fluid does not reach a pressure limit.

Next, sixth through eighth embodiments of the present invention will be described with reference to FIGS. 13–15. In the fifth embodiment, if once the communication hole or holes 15 are opened due to input of kick-back force, the opened state continues. In the sixth through eighth embodiments, the communication hole or holes 15 are closed again after the input of kick-back force terminates. In the sixth through eighth embodiments, only the check valve 2 is shown.

Figure 13:
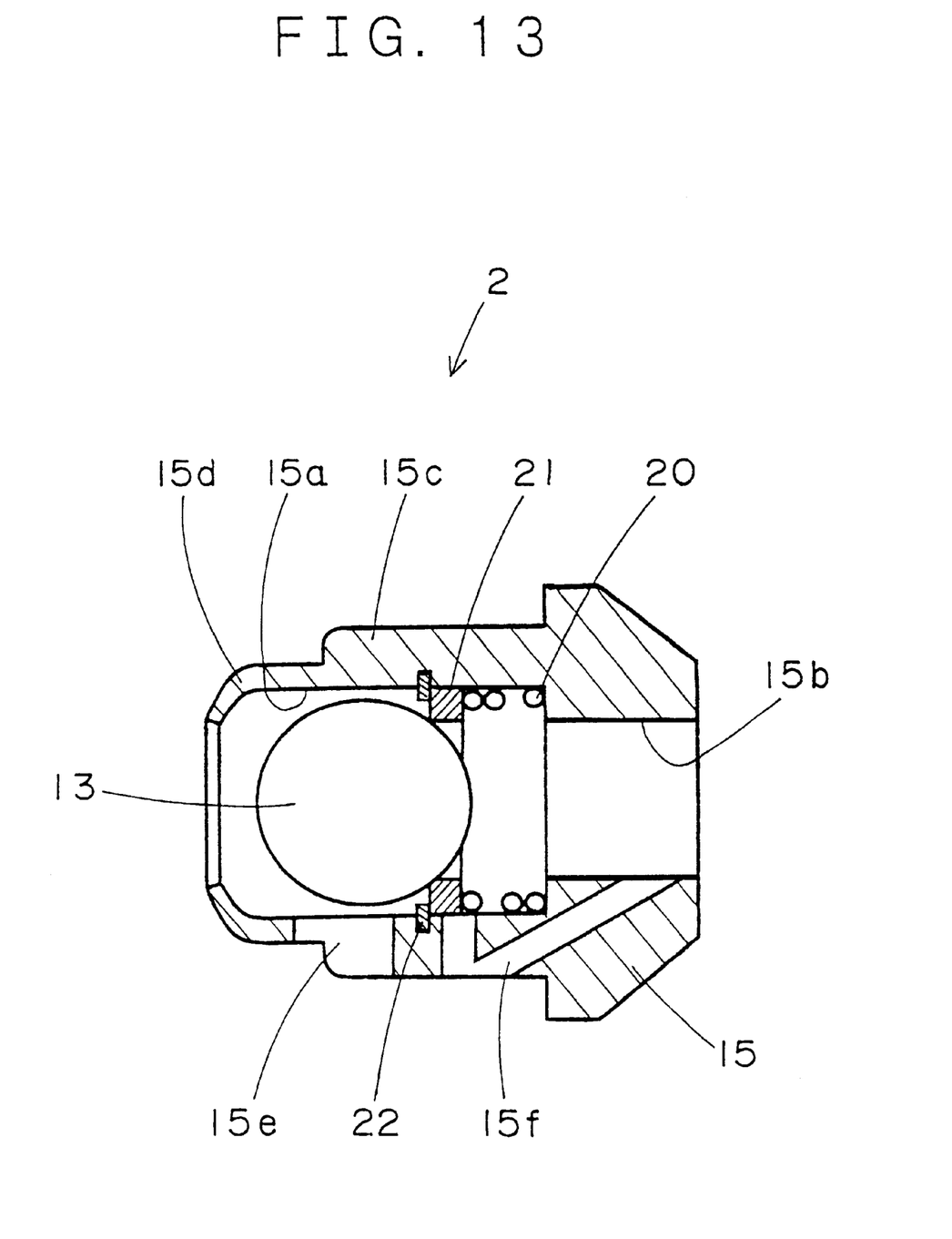
FIG. 13 is a sectional view of a check valve according to a sixth embodiment of the present invention.

In the sixth embodiment shown in FIG. 13, instead of the ring 19 used in the fifth embodiment, a spring 20, a ring member 21, and a circlip (snap ring) 22 are provided. The ring member 21 is slidably disposed within the larger diameter hole 15a of the seat union 15 and is urged by the spring 20. The circlip 22 restricts leftward movement of the ring member 21 in FIG. 13 and determines the initial position of the ring member 21 such that the ring member 21 closes the communication hole or holes 15f.

Figure 14:
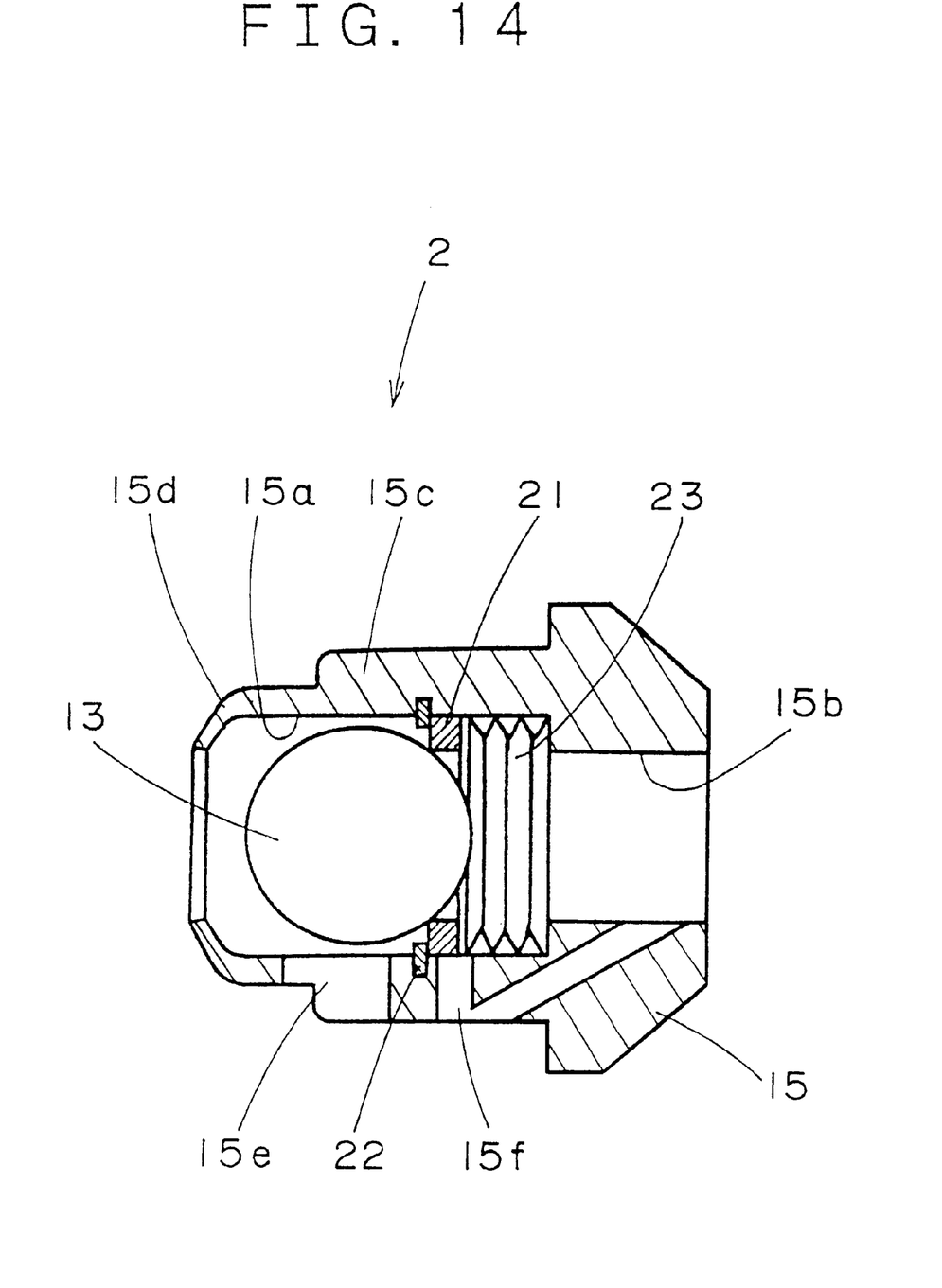
FIG. 14 is a sectional view of a check valve according to a seventh embodiment of the present invention.

In the seventh embodiment shown in FIG. 14, instead of the spring 20 used in the sixth embodiment, a bellows 23 made of an elastic material such as a resin is used.

Figure 15:
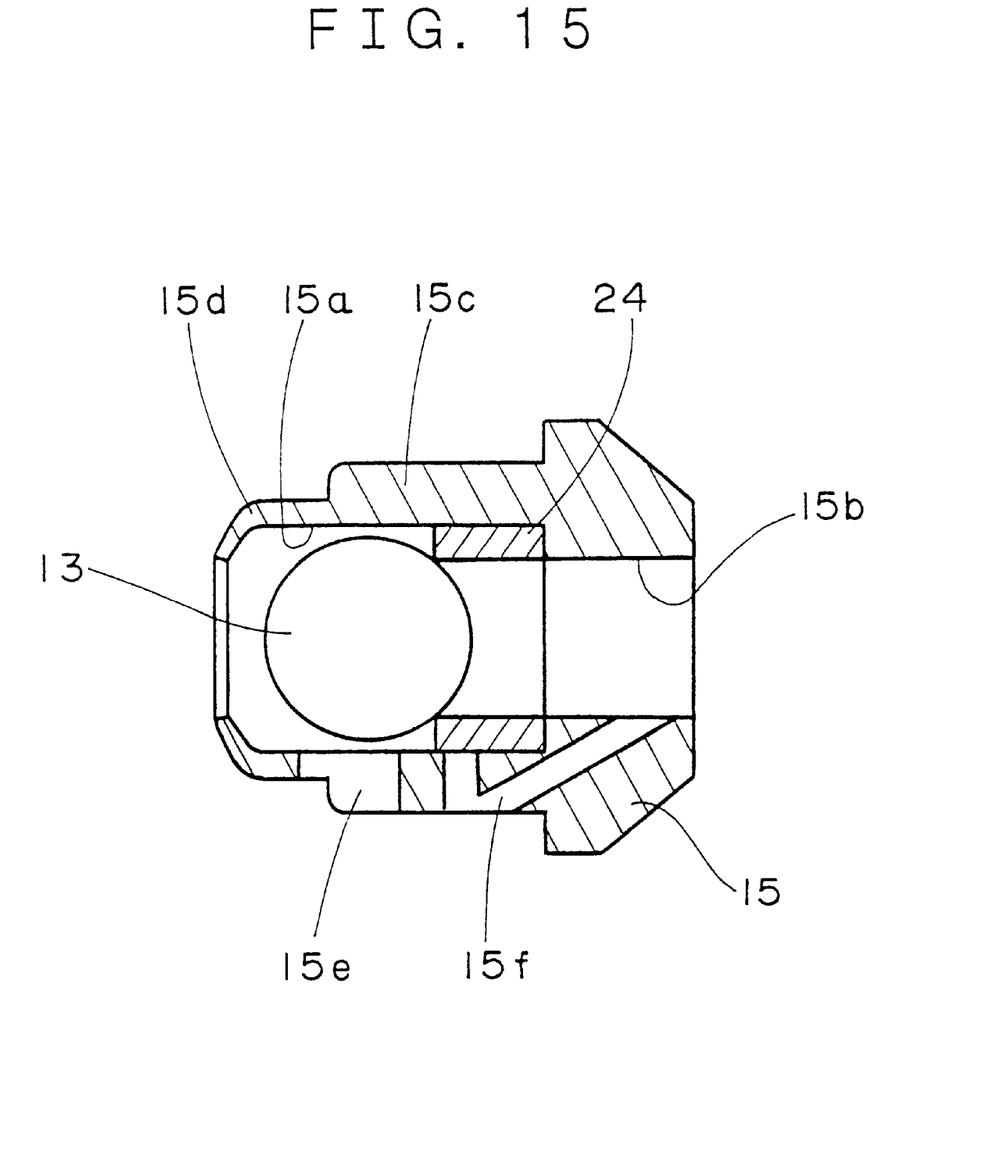
FIG. 15 is a sectional view of a check valve according to an eighth embodiment of the present invention.

In the eighth embodiment shown in FIG. 15, instead of the ring 19 used in the fifth embodiment, a cylindrical member 24 made of an elastic material such as a resin is used. The cylindrical member 24 has a length such that the cylindrical member 24 covers and closes the communication hole or holes 15f in an ordinary sate, and an elasticity such that when the pressure acting on the ball 13 reaches a predetermined level, the cylindrical member 24 contracts to such a degree that the communication hole or holes 15f are opened.

In the sixth through eighth embodiments, when a large kick-back force is input to the power steering apparatus, the communication hole or holes 15f are opened to allow reverse flow of the operation fluid. Therefore, the pressure of the operation fluid does not reach the pressure limit. Also, when the input of kick-back force terminates, the check valve 2 can return to the original state.

In the above-described embodiment, the check valve (and the pressure relief means) are disposed within the seat-union-type tube joint. However, the check valve (and the pressure relief means) may be disposed in an eye-union-type tube joint. Further, the check valve (and the pressure relief means) may be disposed at a different position, other than the tube joint, for example, within a metal pipe disposed between the rubber hose and the tube joint.

Obviously, numerous modifications and variations of the present invention are possible in light of the above teachings. It is therefore to be understood that within the scope of the appended claims, the present invention may be practiced otherwise than as specifically described herein.

What is claimed is:

1. A hydraulic power steering apparatus comprising:
    a pump for discharging pressurized operation fluid;
    a power cylinder for generating assisting force;
    a control valve connected to said pump via a fluid path for receiving the operation fluid from said pump and adapted to supply the operation fluid to said power cylinder in accordance with operation of a steering wheel;
    a check valve disposed in said fluid path; and
    a bypass passage in parallel with the check valve, said bypass valve partially relieving a pressure of the operation fluid when said check valve operates.

2. A hydraulic power steering apparatus according to claim 1, wherein said bypass passage is a relief valve which is disposed within said control valve at a position facing said fluid path.

3. A hydraulic power steering apparatus according to claim 1, wherein said bypass passage is a relief valve disposed within a piston which in accommodated within said power cylinder and divides the inner chamber of said power cylinder into two pressure chambers.

4. A hydraulic power steering apparatus according to claim 1, wherein said bypass passage operates only when a pressure acting on said check valve reaches a predetermined level.

5. A hydraulic power steering apparatus according to claim 1, wherein said bypass passage comprises a ball, and a seat union having a larger diameter hole and a smaller diameter hole and being pushed by said ball when a pressure acting on said ball exceeds a predetermined level, an open end portion of said seat union is caulked after said ball is placed into the larger diameter hole of said seat union.

6. A hydraulic power steering apparatus according to claim 1, wherein said bypass passage comprises a ball, a cup-shaped tubular member in which said ball is accommodated, and a seat union press-fitted into said tubular member and having a ball-seat surface on which said ball sits.

7. A hydraulic power steering apparatus according to claim 6, wherein said bypass passage further comprises a groove formed in the ball-seat surface of said seat union.

8. A hydraulic power steering apparatus according to claim 6, wherein said bypass passage further comprises a through hole that penetrates said seat union.

* * * * *